United States Patent [19]
Sato et al.

[11] Patent Number: 5,318,245
[45] Date of Patent: Jun. 7, 1994

[54] BRAKE APPARATUS FOR A FISHING REEL

[75] Inventors: Jun Sato, Sakai; Shinichi Morimoto, Nishinomiya; Yoshiyuki Furomoto, Osaka, all of Japan

[73] Assignee: Shimano Inc., Osaka, Japan

[21] Appl. No.: 912,697

[22] Filed: Jul. 13, 1992

[30] Foreign Application Priority Data

Jul. 18, 1991 [JP] Japan ............................ 3-055588[U]
Jan. 21, 1992 [JP] Japan ................................. 4-008218

[51] Int. Cl.⁵ ............................................. A01K 89/02
[52] U.S. Cl. .................................. 242/288; 188/267; 188/164; 310/105; 310/93
[58] Field of Search ............... 242/288, 289; 310/93, 310/105, 106; 188/267, 184, 185, 186, 164

[56] References Cited

U.S. PATENT DOCUMENTS

| | | | |
|---|---|---|---|
| 2,550,861 | 5/1951 | Ransom | 242/288 |
| 3,704,766 | 12/1972 | Jaeschke | 188/164 |
| 3,709,342 | 1/1973 | Spencer | 188/164 X |
| 4,013,241 | 3/1977 | Gray | 242/288 |
| 4,561,605 | 12/1985 | Nakajima | 310/105 X |
| 4,601,438 | 7/1986 | Young | 310/105 X |
| 4,601,439 | 7/1986 | Moosberg | 310/105 X |
| 4,618,106 | 10/1986 | Noda | 242/290 |
| 4,710,689 | 12/1987 | Uetsuki et al. | 242/288 X |
| 4,722,492 | 2/1988 | Uetsuki et al. | 242/289 |
| 4,940,194 | 7/1990 | Young | 242/288 |
| 4,946,115 | 8/1990 | Müller | 242/289 |

FOREIGN PATENT DOCUMENTS 552782 1/1990 Japan .

Primary Examiner—Joseph J. Hail, III
Assistant Examiner—Paul Bowen
Attorney, Agent, or Firm—Dickstein, Shapiro & Morin

[57] ABSTRACT

A fishing reel has a brake apparatus disposed between a reel body and a spool shaft. The brake apparatus includes a rotary element mounted on the spool shaft to be rotatable relative thereto and to the reel body, a first brake mechanism for transmitting a braking force from the reel body to the rotary element, and a second brake mechanism for transmitting the braking force from the rotary element to the spool shaft. When the spool reaches a maximum rotating speed, rotating speed of the rotary element does not increase greatly since the first brake mechanism slips due to inertia of the rotary element. Subsequently, the rotating speed of the rotary element increases with lapse of time. As a result, the first brake mechanism effectively applies a braking force to the spool after the spool reaches the maximum speed.

9 Claims, 6 Drawing Sheets

BRAKE APPARATUS FOR A FISHING REEL

BACKGROUND OF THE INVENTION

1. Field of the Invention

This invention relates to a brake apparatus for a fishing reel, and more particularly to an improvement in a brake apparatus having a braking device disposed between a spool or a rotating system including a member interlocked and rotatable with the spool, and a stationary system provided by a reel body.

2. Description of the Related Art

Known brake apparatus for fishing reels include a centrifugal type brake. This type of brake apparatus has radially displaceable braking pieces arranged on a system rotatable with the spool, and an annular friction member for contacting the braking pieces when the rotating system rotates (this apparatus being hereinafter referred to also as the "centrifugal brake": see Japanese Patent Publication No. 1955-8116, for example).

The known centrifugal brake applies a braking force proportional to the square of a rotating speed of the spool. Thus, this brake has characteristics to produce a relatively strong braking force immediately after the spool starts rotating. The centrifugal brake produces a maximum braking force when the spool rotation reaches a maximum speed.

However, where a maximum braking force is produced when the spool rotation reaches a maximum speed, an insufficient braking force tends to be produced after the spool rotation begins to slow down from the maximum speed. This could result in a backlash.

In order to avoid the lack in the braking force occurring with a slow-down of the spool rotation, it is conceivable to increase the weight of the braking pieces or use braking pieces having a large coefficient of friction. However, such a measure would produce an excessive braking force when the spool rotation reaches the maximum speed. This results in such an inconvenience as an insufficient distance to which a lure or other type of bait is cast.

A backlash seldom occurs when the spool rotation is accelerated in an initial stage of bait-casting action (which is a very brief period of time). A backlash tends to occur after the acceleration of the spool rotation, when the fishing line relaxes under air resistance acting on the fishing line or bait, or when the bait hits a water surface.

On the other hand, it is important for this type of brake apparatus to produce a great braking force when the spool rotates at high speed. As noted above, a backlash tends to occur when the spool begins to slow down after reaching the high speed rotation. Thus, there is a desire for a brake apparatus that reliably applies a braking force to the spool in a beginning stage of its slow-down.

SUMMARY OF THE INVENTION

The object of the present invention is to provide an improved brake apparatus for eliminating the possibility of a backlash occurring after spool rotation begins to slow down, while allowing a bait to be cast to a maximal distance.

The above object is fulfilled, according to a first aspect of the present invention, by a brake apparatus for a fishing reel comprising a braking device disposed between a rotating system and a stationary system as set forth in the outset hereof, wherein the braking device includes a plurality of brake mechanisms arranged in series to be operable in succession in transmitting a braking force from the stationary system to the spool when the spool is rotated.

In a second aspect of the invention, there is provided a brake apparatus for a fishing reel comprising a braking device disposed between a rotating system and a stationary system as set forth in the outset hereof, wherein the braking device includes a rotary element coaxial with the rotating system and rotatable relative to both of the rotating system and the stationary system, a first brake mechanism for transmitting a braking force from the stationary system to the rotary element and a second brake mechanism for transmitting the braking force from the rotary element to the spool shaft.

The present invention has the following functions and effects:

The above features may be arranged as shown in FIG. 1, for example, in which the first and second brake mechanisms S and T transmit the greater braking force, the faster the rotary element 5 rotates. When a bait is cast, rotation of the spool 2 reaches a maximum speed within a short time. Since the rotary element 5 is freely rotatable in an initial stage of the spool rotation, the second brake mechanism T does not apply a braking force but causes the first brake mechanism S to slip smoothly for allowing the rotary element 5 to rotate. Consequently, there occurs a time lag before the rotary element 5 reaches the maximum rotating speed. When the spool 2 reaches the maximum rotating speed, the first brake mechanism S applies a braking force to the spool 2 with a delay. Moreover, after the rotary element 5 reaches the rotating speed of the spool 2, the first brake mechanism S applies to the spool 2 a braking force corresponding to the rotating speed of the spool 2.

A microscopic examination of an initial stage of bait casting shows that the rotary element 5 stands still when the rotating system starts rotating. This rotary element 5 is lighter than the spool R. Therefore, even if the spool 2 reaches the maximum rotating speed within a very short time, the first brake mechanism S applies only an extremely weak braking force to the spool 2 during the initial stage.

Further, the features of the invention may be arranged as shown in FIG. 3, for example, in which the first brake mechanism S applies the smaller braking force, the faster the rotary element 5 rotates. When a bait is cast, rotation of the spool 2 reaches a maximum speed within a short time, and so does the rotary element 5. However, the first brake mechanism S applies only a weak braking force to the rotary element 5 while the rotary element 5 rotates at high speed. As the rotation of the rotary element 5 subsequently slows down, the first brake mechanism S applies an increasing braking force to the rotary element 5.

Thus, according to the present invention, a maximum braking force is not applied to the spool 2 even when the spool 2 reaches the maximum rotating speed at a bait casting time. The spool 2 is braked only after reaching the maximum rotating speed. An appropriate braking force is applied to the spool 2 when the rotating speed thereof has begun to slow down, i.e. in a situation most vulnerable to a backlash. This checks the inconvenience occurring with the known centrifugal brake which applies a maximum braking force when the spool reaches a maximum rotating speed.

The restraint of an increase in the initial braking force, combined with the increase in the braking force with lapse of time, results in an effective braking force operable in a later stage of bait casting such as when the bait hits a water surface.

Thus, the present invention provides an improved brake apparatus which eliminates a backlash occurring after spool rotation begins to slow down, while allowing a bait to be cast to a maximal distance.

According to the present invention, torque of the spool is not transmitted directly to the rotary element, the latter being driven by the brake mechanism capable of slipping. This provides the advantage that the rotary element has a small starting torque at a casting time to facilitate fine adjustment of the braking device.

Other features and advantages of the present invention will be apparent from the following description of the preferred embodiments.

DETAILED DESCRIPTION OF THE PREFERRED EMBODIMENTS

A brake apparatus for a fishing reel according to the present invention will be described in detail with reference to the drawings.

Figure 2:
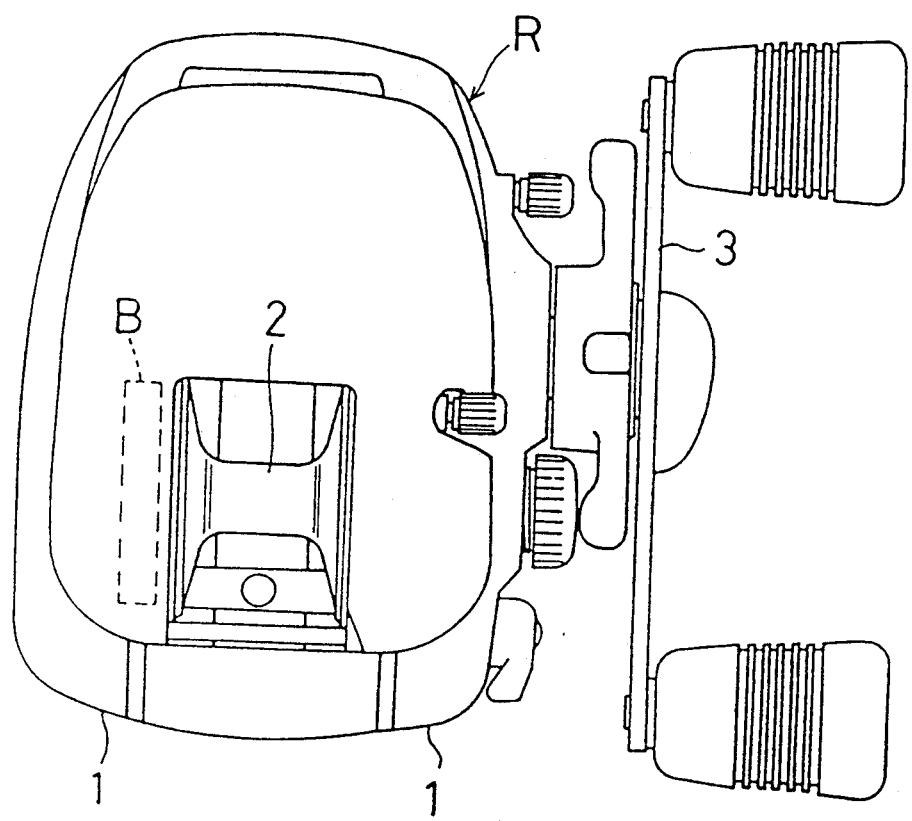
FIG. 2 is a plan view of the fishing reel.

FIG. 2 shows a baitcasting reel embodying the present invention. The reel comprises right and left side cases 1 constituting a reel body R, and a spool 2 mounted between the side cases 1 for winding a fishing line (not shown). A handle 3 is disposed outwardly of the right side case 1, and a brake apparatus B is contained in the left side case 1.

The reel body R includes a clutch mechanism (not shown) mounted in a transmission line for transmitting drive from the handle 3 to the spool 2.

Figure 1:
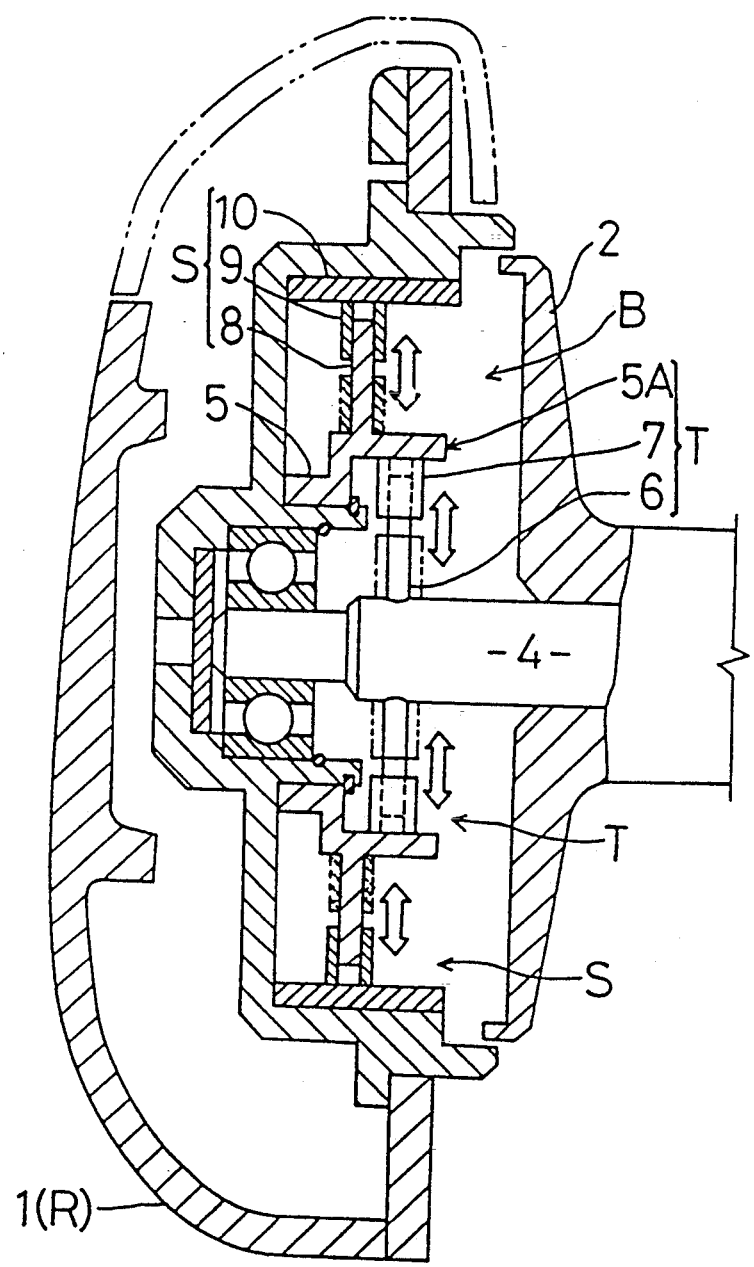
FIG. 1 is a sectional view of a brake apparatus for a fishing reel according to the present invention.

The brake apparatus B has a braking device disposed between a spool shaft 4 acting as a rotating system rotatable with the spool 2 and the reel body R acting as a stationary system. As shown in FIG. 1, the braking device includes a rotary element 5 coaxial with the spool shaft 4 and rotatable relative to both the spool shaft 4 and reel body R, a first brake mechanism S for transmitting a braking force from the reel body R to the rotary element 5, and a second brake mechanism T for transmitting the braking force from the rotary element 5 to the spool shaft 4. Thus, the braking device is operable to brake the spool 2 with the braking force transmitted from the reel body R through the rotary element 5. The second brake mechanism T is a centrifugal type including shafts 6 extending radially of the spool shaft 4, tubular collars 7 (one example of braking pieces) slidably mounted on the shafts 6, respectively, and a cylindrical portion 5A of the rotary element 5 disposed in a position for contacting the collars 7 when the spool 2 is in rotation. The first brake mechanism S also is a centrifugal type including rods 8 extending radially of the rotary element 5, collars 9 (one example of braking pieces) slidably mounted on the rods 8, respectively, and a cylindrical friction member 10 fixed to an inner surface of the side case 1 for contacting the collars 9.

At a casting time, rotating speed of the spool 2 increases within a short time. With this brake apparatus B, even when the spool 2 reaches a maximum rotating speed, rotating speed of the rotary element 5 does not increase greatly since the first brake mechanism S slips due to inertia of the rotary element 5. Subsequently, the rotating speed of the rotary element 5 increases with lapse of time. As a result, the first brake mechanism S effectively applies a braking force to the spool 2 after the spool 2 reaches the maximum speed.

Another embodiment will be described next.

In this embodiment, the reel body R has the same construction as in the preceding embodiment, but the brake apparatus B has a different construction.

Figure 3:
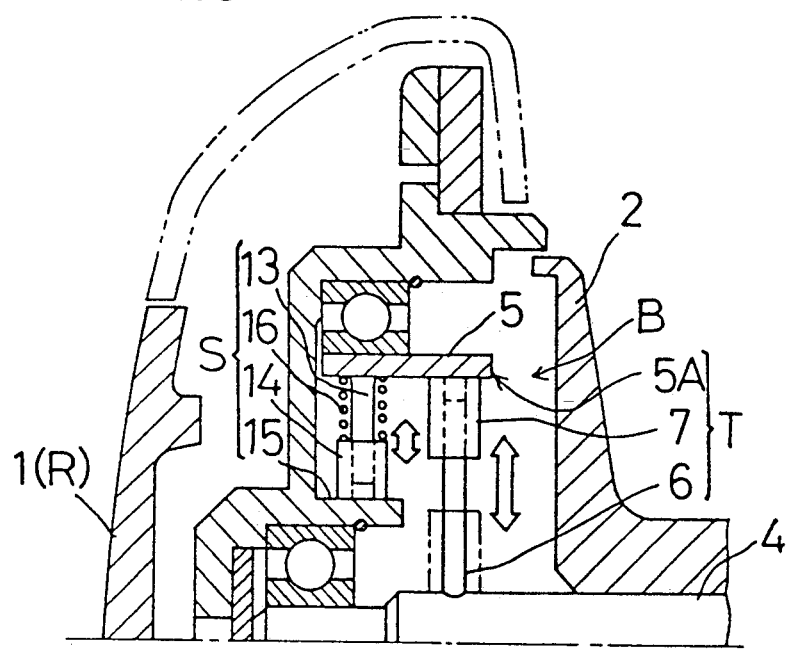
FIG. 3 is a sectional view of a brake apparatus in another embodiment of the invention.

As shown in FIG. 3, the brake apparatus B has a braking device including a rotary element 5 coaxial with the spool shaft 4 and rotatable relative to the reel body R, a first brake mechanism S for transmitting the weaker braking force from the reel body R the faster the rotary element 5 rotates relative to the reel body R, and a second brake mechanism T for transmitting the braking force from the rotary element 5 to the spool shaft 4. The second brake mechanism T is a centrifugal type including shafts 6 extending radially of the spool shaft 4, tubular collars 7 (one example of braking pieces) slidably mounted on the shafts 7, respectively, and a cylindrical portion 5A of the rotary element 5 disposed in a position for contacting the collars 7 when the spool 2 is in rotation. The first brake mechanism S is a centrifugal type including rods 13 extending radially of the rotary element 5, collars 14 (one example of braking pieces) slidably mounted on the rods 13, respectively, a cylindrical friction member 15 fixed to an inner surface of the side case 1 and disposed closer than the cylindrical portion 5A to the axis, and springs 16 for biasing the braking pieces 14 toward the friction member 15.

At a casting time, rotating speed of the spool 2 increases within a short time. With this brake apparatus B, the second brake mechanism T slips slightly under inertia of the rotary element 5 to enable the increase in the rotating speed of the spool 2. Even if the rotary element 5 rotates through the second brake mechanism T, a relatively weak braking force is transmitted through the first brake mechanism S when the spool 2 rotates at high speed. Subsequently, the first brake mechanism S applies an increased braking force with a slow-down of the rotating speed of the spool 2. Thus, the braking force is effectively applied in a situation such as when a bait hits a water surface.

Figure 4:
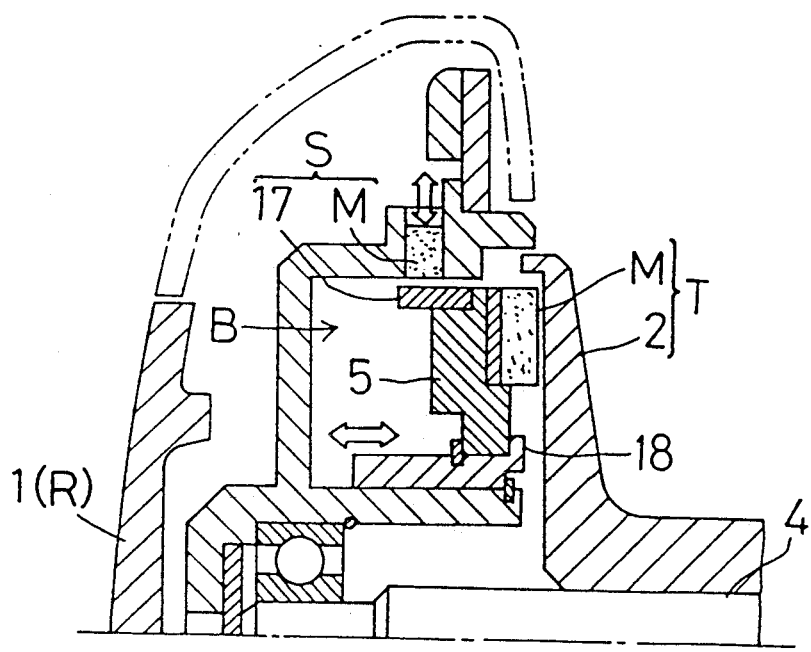
FIG. 4 is a sectional view of a brake apparatus in a different embodiment (a)

The foregoing embodiments may be modified as follows:

(a) As shown in FIG. 4, the second brake mechanism T is what is known as a magnet brake including a spool 2 formed of a conductive material, and first permanent magnets M mounted on a rotary element 5. The first brake mechanism S also is a magnet brake including an annular member 17 formed of a conductive material and mounted on the rotary element 5, and second permanent magnets M arranged at an adjustable distance to the annular member 17. The first brake mechanism S has a braking force adjustable by varying positions of the second permanent magnets M. The braking force occurring between the spool 2 and rotary element 5 is adjustable by axially moving a cylindrical member 18 rotatably supporting the rotary element 5.

Figure 5:
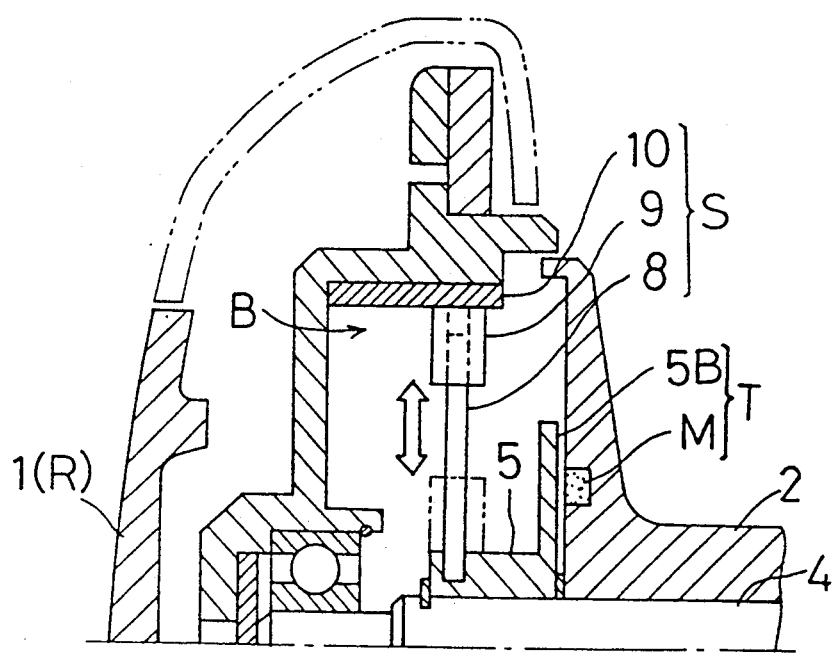
FIG. 5 is a sectional view of a brake apparatus in a different embodiment (b)

(b) As shown in FIG. 5, the second brake mechanism T is a magnet brake including permanent magnets M fitted in a side wall of the spool 2, and a ferromagnetic disk 5B formed of steel, for example, and provided on the rotary element 5. The first brake mechanism S is a centrifugal type brake including rods 8 extending radially of the rotary element 5, collars 9 (one example of braking pieces) slidably mounted on the rods 8, respectively, and a cylindrical friction member 10 for contacting the collars 9. The second brake mechanism T slips when a great braking force is applied from the first brake mechanism S as when the spool 2 rotates at a very high speed.

Figure 6:
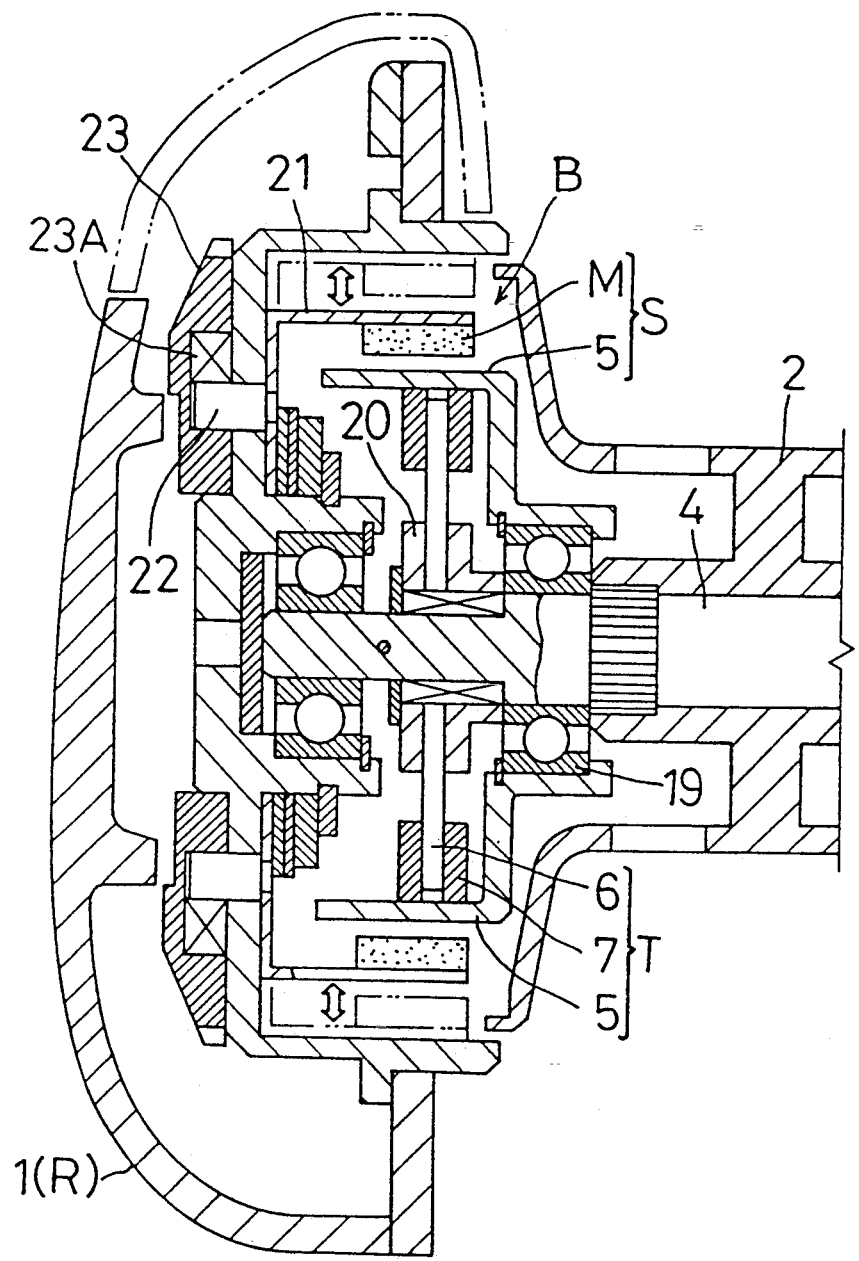
FIG. 6 is a sectional view of a brake apparatus in a different embodiment (c)

(c) FIG. 6 shows a rotary element 5 formed of a conductive material such as a metal and rotatably supported on the spool shaft 4 through a bearing 19. The first brake mechanism S is a magnet brake including the rotary element 5, and permanent magnets M surrounding the rotary element 5 to be radially movable relative thereto. The second brake mechanism T is a centrifugal brake including shafts 6 supported by a holder 20 and extending radially of the spool shaft 4, tubular collars 7 (one example of braking pieces) slidably mounted on the shafts 6, respectively, and the rotary element 5 disposed in a position for contacting the collars 7 when the spool 2 is in rotation. The rotary element 5 has a small starting torque at a casting time.

In this brake apparatus B, the permanent magnets M are supported by a frame 21 having pins 22 extending into cam grooves 23A of a dial 23. Thus, the braking force of the first brake mechanism S is adjustable by turning the dial 23. The rotary element 5 and collars 7 may be formed of a magnetic material, so that the braking force is adjustable over a wide range.

Figure 7:
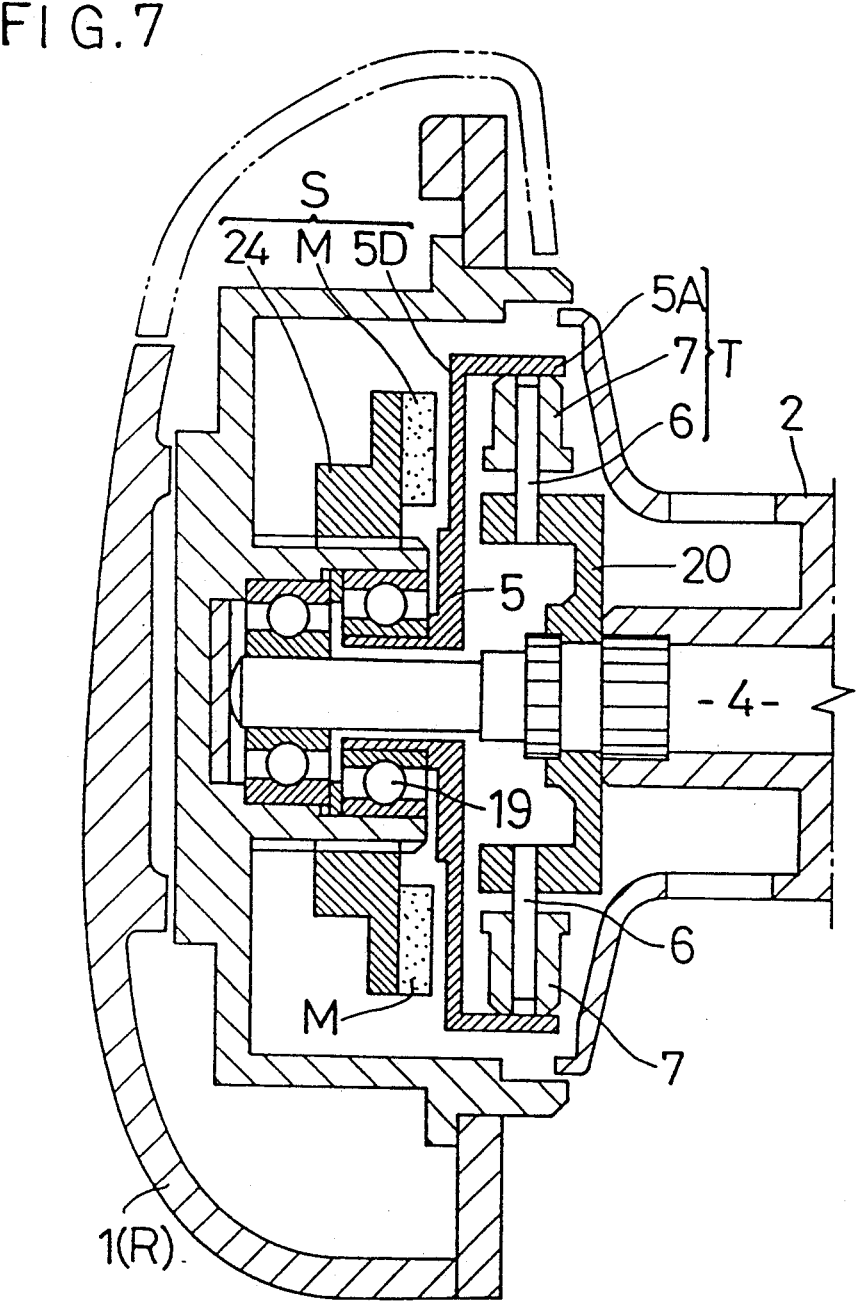
FIG. 7 is a sectional view of a brake apparatus in a different embodiment (d).

(d) FIG. 7 shows a rotary element 5 formed of a non-magnetic, conductive material such as copper or aluminum, and supported by the reel body R through a bearing 19. The first brake mechanism S is a magnet brake including permanent magnets M mounted on a shift member 24 movable axially of the spool shaft 4 and not rotatable relative to the reel body R, and a disk-like portion 5D of the rotary element 5. The second brake mechanism T is a centrifugal brake including a pair of shafts 6 supported by the spool shaft 4 through a holder 20, collars 7 (one example of braking pieces) slidably mounted on the shafts 6, respectively, and a cylindrical portion 5A of the rotary element 5. In an actual fishing situation, a bait is cast after setting the shift member 24 to an appropriate position.

With this construction, the braking force applied to the spool 2 is adjustable by selecting a position of the shift member 24.

(e) According to the present invention, two or more braking devices may be arranged coaxially instead of using the rotary element, to produce a relatively large time lag in the braking force at a starting time of spool rotation. The rotating system rotatable with the spool 2 may include a transmission member interlocked to the spool shaft 4 through gearing or the like.

What is claimed is:

1. A brake apparatus for a fishing reel comprising:
   braking means, disposed between a spool and a stationary system provided by a reel body, for applying a braking force against rotation of said spool;
   wherein said braking means includes:
   a rotary element coaxial with said spool and rotatable relative to both of said spool and said stationary system;
   a first brake mechanism for transmitting a first braking force from said stationary system through said rotary element to said spool; and
   a second brake mechanism for transmitting a second braking force from said rotary element to said spool.

2. A brake apparatus as claimed in claim 1, wherein said first brake mechanism includes braking pieces formed on said rotary element for contacting said stationary system with increasing force in response to increased relative velocity between the rotary element and the stationary system.

3. A brake apparatus as claimed in claim 1, wherein said first brake mechanism includes braking pieces formed on said rotary element for contacting said spool with decreasing force in response to increased relative velocity between the rotary element and the spool.

4. A brake apparatus as claimed in claim 1, wherein said second brake mechanism includes braking pieces formed on said spool for contacting said rotary element with increasing force in response to increased relative velocity between the rotary element and the spool.

5. A brake apparatus as claimed in claim 1, wherein said first brake mechanism includes second permanent magnets formed on said stationary system to provide a braking force by generating the greater induced electromotive force the faster a relative rotation is, and an annular member formed of a conductive material and mounted on said rotary element, and said second brake mechanism includes a spool formed of a conductive material, and first permanent magnets mounted on said rotary element.

6. A brake apparatus as claimed in claim 1, wherein said second brake mechanism includes permanent magnets fitted in a side wall of said spool, and a ferromagnetic disk provided on said rotary element, and said first brake mechanism includes rods extending radially of said rotary element, braking pieces slidably mounted on said rods, respectively, and a cylindrical friction member for contacting said braking pieces.

7. A brake apparatus as claimed in claim 1, wherein said first brake mechanism includes said rotary element, and permanent magnets surrounding said rotary element to be radially movable relative thereto, and said second brake mechanism includes shafts supported by a holder and extending radially of said spool shaft, tubular braking pieces slidably mounted on said shafts, respectively, and said rotary element disposed in a position for contacting said braking pieces when said spool is in rotation.

8. A brake apparatus as claimed in claim 1, wherein said first brake mechanism includes permanent magnets mounted on a shift member movable axially of said spool shaft and a disk-like portion of said rotary element, and said second brake mechanism includes a pair of shafts supported by said spool shaft through a holder constantly rotatable in unison with said spool shaft, braking pieces slidably mounted on said shafts, respectively, and a cylindrical portion of said rotary element.

9. A brake apparatus as claimed in claim 1, further comprising a spool shaft for said spool, and wherein said first brake mechanism includes first shafts mounted on said rotary element, braking pieces slidably mounted on said first shafts, and a friction member secured to an inner face of a side case, and wherein said second brake mechanism includes second shafts supported by said spool shaft, braking pieces slidably mounted on said second shafts, and a cylindrical portion of said rotary element.

* * * * *